United States Patent
Nakamura et al.

(10) Patent No.: US 10,198,426 B2
(45) Date of Patent: *Feb. 5, 2019

(54) METHOD, SYSTEM, AND COMPUTER PROGRAM PRODUCT FOR DIVIDING A TERM WITH APPROPRIATE GRANULARITY

(71) Applicant: International Business Machines Corporation, Armonk, NY (US)

(72) Inventors: Taiga Nakamura, Sunnyvale, CA (US); Tamotsu Sogo, Tokyo (JP); Hironori Takeuchi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/421,235

(22) Filed: Jan. 31, 2017

(65) Prior Publication Data
US 2017/0139897 A1    May 18, 2017

Related U.S. Application Data

(63) Continuation of application No. 14/811,408, filed on Jul. 28, 2015.

(30) Foreign Application Priority Data

Jul. 28, 2014 (JP) .................................. 2014-152580

(51) Int. Cl.
*G06F 17/27*  (2006.01)
*G06F 17/28*  (2006.01)

(52) U.S. Cl.
CPC ........ *G06F 17/2705* (2013.01); *G06F 17/274* (2013.01); *G06F 17/2735* (2013.01); *G06F 17/2863* (2013.01); *G06F 17/277* (2013.01)

(58) Field of Classification Search
CPC combination set(s) only.
See application file for complete search history.

(56) References Cited

FOREIGN PATENT DOCUMENTS

| | | |
|---|---|---|
| JP | H04215182 A | 8/1992 |
| JP | H06231188 A | 8/1994 |
| JP | 07085101 A | 3/1995 |
| JP | H0765008 A | 3/1995 |
| JP | 08305695 A | 11/1996 |
| JP | 10207890 A | 8/1998 |
| JP | H10260824 A | 9/1998 |
| JP | 200132584 A | 11/2001 |
| JP | 2002259370 A | 9/2002 |
| JP | 2003015869 A | 1/2003 |
| JP | 2005293582 A | 10/2005 |

(Continued)

OTHER PUBLICATIONS

Miyazaki, M., et al., "Japanese Compound Noun Structure Analyzer Using Structured Chart Parser," The Association for Natural Language Processing, Mar. 2008. (5 pages).

(Continued)

*Primary Examiner* — Vu B Hang
(74) *Attorney, Agent, or Firm* — Kelsey M. Skodje (57) ABSTRACT

A method, computer system, and computer program product for dividing a term with appropriate granularity includes extracting an element word specifying granularity from content by parsing, and, if the term includes at least one element word in a part thereof, dividing the term at a position where the at least one element word exists.

8 Claims, 6 Drawing Sheets

(56) References Cited

FOREIGN PATENT DOCUMENTS

| JP | 2007264718 A | 10/2007 |
|---|---|---|
| JP | 20072573690 A | 10/2007 |
| JP | 2008140359 A | 6/2008 |
| JP | 2010204866 A | 9/2010 |
| JP | 2011096245 A | 5/2011 |
| JP | 2012234512 A | 11/2012 |

OTHER PUBLICATIONS

Ohta, S., et al., "Structure Analyzing of Japanese Compound Noun Using Rules and Corpus," Proceedings of the Third Annual Meeting of the Association for Natural Language Processing, Mar. 1997. (9 pages). (Machine Translation Provided).
Takahashi, M., et al., "Japanese Compound Noun Analysis Using Structuring Rules," Proceedings of the Ninth Annual Meeting of the Association for Natural Language Processing, Mar. 2003. (5 pages).
Takada, K., "Organization of data from perspective of business: A Study of the integrated database design," DB Magazine, Feb. 1, 2009, vol. 18, No. 10, pp. 98-110, Japan, Shoeisha Co., Ltd. (English translation unavailable).
Decision to Grant a Patent, JP Patent Application No. 2014-152580, dated Jun. 27, 2016.
Nakamura et al., "Method, System, and Computer Program Product for Dividing a Term with Appropriate Granularity," U.S. Appl. No. 14/811,408, filed Jul. 28, 2015.
List of IBM Patents or Patent Applications Treated as Related, Signed Jan. 31, 2017, 2 pages.

METHOD, SYSTEM, AND COMPUTER PROGRAM PRODUCT FOR DIVIDING A TERM WITH APPROPRIATE GRANULARITY

BACKGROUND

Technical Field

The present invention relates to a term division method. In particular, the present invention relates to a method for dividing a term with appropriate granularity.

Background Art

Compound nouns, each of which is constituted by multiple words (e.g., two to six words), are endlessly created by connecting multiple nouns or affixes corresponding to nouns.

A glossary, created in development of a system, includes the compound nouns described above. However, the meanings of the compound nouns are often unknown when the compound nouns are seen at a glance.

Especially, a glossary for a system of a financial institution may include compound nouns, such as (a compound noun constituted by kanji characters) and (a compound noun constituted by kanji characters).

In the case of English language, a noun phrase is formed by connecting multiple words. For example, "beneficiary right seller's business security deposit" and "financial instruments intermediary service" are given.

Techniques for dividing a compound noun by applying a morphological analysis technique to the compound noun are known (See, e.g., Non Patent Literature 1 and 2 below). In the morphological analysis technique, however, since a compound noun is divided on the basis of a system dictionary and grammar held by a morphological analyzer, a desirable result is not necessarily obtained.

For example, when the morphological analyzer divides (a compound noun constituted by kanji characters) described above using the morphological analysis technique, it is divided in words like (words constituted by kanji characters). Furthermore, if the morphological analyzer divides (a compound noun constituted by kanji characters) described above using the morphological analysis technique, which is originally one word (that is, one word which is an abbreviated word of (written in kanji characters), is divided in kanji characters like (words constituted by kanji characters).

When the morphological analyzer divides "business security deposit" described above using the morphological analysis technique, it is difficult to judge whether to divide it as "business security" +"deposit" or "business" +"security deposit" or to leave it as "business security deposit" without dividing it.

Patent Literature 1 to 10 below describes analysis of a sentence or extraction of a keyword.

Patent Literature 1 JP2007-257390A
Patent Literature 2 JP10-207890A
Patent Literature 3 JP07-85101A
Patent Literature 4 JP2007-264718A
Patent Literature 5 JP08-305695A
Patent Literature 6 JP2001-325284A
Patent Literature 7 JP2010-204866A
Patent Literature 8 JP2011-96245A
Patent Literature 9 JP2008-140359A
Patent Literature 10 JP2012-234512A Non Patent Literature Non Patent Literature 1 "Structure Analyzing of Japanese Compound Noun Using Rules and Corpus" by Satoru Ohta et al.; Proceedings of the Third Annual Meeting of the Association for Natural Language Processing, pp. 313-316, March 1997; available from <URL: http://www.anlp.jp/proceedings/annual_meeting/2003/pdf_dir/C6-2.pdf>

Non Patent Literature 2 "Japanese Compound Noun Analysis Using Structuring Rules" by Mitsuhiko Takahashi et al.; Proceedings of the Ninth Annual Meeting of the Association for Natural Language Processing, pp. 541-544, March 2003; available from <URL: http://www.anlp.jp/proceedings/annual_meeting/2003/pdf_dir/C6-2.pdf>

Non Patent Literature 3 "Japanese Compound Noun Structure Analyzer Using Structured Chart Parser" by Masahiro Miyazaki et al.; The Association for Natural Language Processing, 2008; available from <URL: http://www-.languetech.co.jp/out/08nlp-miyazaki.pdf>

SUMMARY

Because compound nouns are endlessly created, it is impossible to register all the compound nouns with a dictionary. Therefore, division of a compound noun is attempted.

However, since the number of created compound nouns is so enormous, as described above, it is not realistic for a person to check, for all terms registered with a glossary, whether or not each of these terms is a compound noun and, in the case of a compound noun, divide the compound noun.

Furthermore, in the case of manually dividing a compound noun, the way of dividing the compound noun depends on the practitioner, and judgment about which is a main term or a modifier differs depending on the practitioner's point of view.

In most cases, a list of main terms and modifiers is not defined in advance. Even if the list is defined in advance, the list is incomplete.

Furthermore, for example, the number of compound nouns registered with a glossary, created in development of a system, is as many as several hundreds. Especially, the number of terms registered with a glossary created in development of a large-scale business system may exceed one thousand.

Furthermore, there is a demand for dividing a term included in a term dictionary for a particular project, not in words or in characters, but in some group of words. For example, there is a demand for dividing (a compound noun constituted by kanji characters) described above as (all are words constituted by kanji characters).

An object of the present invention is to provide a method for dividing a term with granularity which a particular project independently has.

Furthermore, an object of the present invention is to provide a method for dividing a term without depending on a practitioner's point of view.

Furthermore, an object of the present invention is to provide a method for dividing a term without requiring a list of main terms or modifiers.

The present invention provides a method, system and computer program product for dividing a term with appropriate granularity. The present principles may include a method for dividing a term with appropriate granularity, a computer system configured to divide a term with appropriate granularity, and a computer program and a computer program product therefor.

A first aspect in accordance with the present invention includes causing a computer system to extract an element word specifying granularity from content by parsing, and if the term includes at least one element word in a part thereof, divide the term at a position where the element word exists.

In one aspect of the present invention, extracting the element word may include applying the parsing to each of pieces of text in the content to extract phrases, and extracting a part that may be the element word, from phrases that include a noun or a mark among the extracted phrases.

In one aspect of the present invention, extracting the element word may further include cutting out, from the content, pieces of text from which the element word is to be extracted; and extracting the phrases may include applying the parsing to each of the cut-out pieces of text.

In one aspect of the present invention, extracting the element word may further include dividing the cut-out pieces of text at a place where a predefined character exists, and extracting the phrases may include applying the parsing to each of the divided pieces of text.

In one aspect of the present invention, the term is a term in a term list, and extracting the element word may further include deleting the term existing in the term list from the part that may be the element word and setting the remainder after the deletion as the element word.

In one aspect of the present invention, dividing may include, if the term includes the element word that is a longest-match element word from the end of the term (a first element word), dividing the term at a position where the longest-match element word from the end (the first element word) exists.

In one aspect of the present invention, dividing the term at the position where the longest-match element word from the end (the first element word) exists may include storing the longest-match element word from the end (the first element word) as a main term of the term.

In one aspect of the present invention, dividing may include, if a term remaining after removing the longest-match element word from the end (the first element word) from the term includes the element word that is a longest-match element word from the top of the term remaining after the removal (the second element word), dividing the term remaining after the removal at a position where the longest-match element word from the top (the second element word) exists.

In one aspect of the present invention, dividing the term remaining after the removal at the position where the longest-match element word from the top (the second element word) exists may further include storing the longest-match element word from the top (the second element word) as a first modifier of the term.

In one aspect of the present invention, dividing the term remaining after the removal at the position where the longest-match element word from the top (the second element word) exists may include storing a part other than the longest-match element word from the top (the second element word) as a second modifier of the term.

In one aspect of the present invention, dividing may include dividing the term at the position where the element word exists in accordance with a division parameter specifying the number of divisions set in advance.

In a second aspect in accordance with the present invention, a computer system for dividing a term with appropriate granularity is provided with extraction means configured to extract an element word specifying granularity from content by parsing, and division means configured to, if the term includes at least one element word in a part thereof, divide the term at a position where the element word exists.

In one aspect of the present invention, the extraction means is further configured to apply parsing to each of pieces of text in the content to extract phrases, and extract a part that may be the element word, from phrases that include a noun or a mark among the phrases extracted.

In one aspect of the present invention, the extraction means is further configured to cut out, from the content, pieces of text from which the element word is to be extracted, and apply the parsing to each of the cut-out pieces of text to extract the phrases.

In one aspect of the present invention, the extraction means is further configured to divide the cut-out pieces of text at a place where a predetermined character exists, and apply the parsing to each of the divided pieces of text to extract the phrases.

In one aspect of the present invention, the term is a term in a term list, and the extraction means is further configured to delete the term existing in the term list from the part that may be the element word and set the remainder after the deletion as the element word.

In one aspect of the present invention, if the term includes the element word that is a longest-match element word from the end of the term (the first element word), the division means is further configured to divide the term at a position where the longest-match element word from the end (the first element word) exists.

In one aspect of the present invention, the division means is further configured to divide the term at the position where the longest-match element word from the end (the first element word) exists and store the longest-match element word from the end (the first element word) as a main term of the term.

In one aspect of the present invention, if a term remaining after removing the longest-match element word from the end (the first element word) from the term includes the element word that is a longest-match element word from the top of the term remaining after the removal (the second element word), the division means is further configured to divide the term remaining after the removal at a position where the longest-match element word from the top (the second element word) exists.

In one aspect of the present invention, the division means is further configured to divide the term remaining after the removal at the position where the longest-match element word from the top (the second element word) exists and store the longest-match element word from the top (the second element word) as a first modifier of the term.

In one aspect of the present invention, the division means is further configured to divide the term remaining after the removal at the position where the longest-match element word from the top (the second element word) exists and store a part other than the longest-match element word from the top (the second element word) as a second modifier of the term.

In one aspect of the present invention, the division means is further configured to divide the term at the position where the element word exists in accordance with a division parameter specifying the number of divisions set in advance.

In a third aspect in accordance with the present invention, a computer program and a computer program product, when executed, cause the computer system to execute the method for dividing a term with appropriate granularity in accordance with one aspect in accordance with the present invention.

Each of the computer programs in accordance with one embodiment of the present invention can be stored in any computer-readable recording medium such as one or more flexible disks, an MO, a CD-ROM, a DVD, a BD, a hard disk device, a memory medium connectable to USB, a ROM, an MRAM and a RAM. In order to store the computer program into the recording medium, the computer program can be downloaded from another data processing system connected via a communication line, for example, a computer or duplicated from another recording medium. The computer program in accordance with one embodiment of the present invention can be compressed or divided into multiple parts, and stored into one or more recording media. Note that the computer program product in accordance with one embodiment of the present invention can be, of course, provided in various forms. The computer program product in accordance with one embodiment of the present invention can include, for example, a recording medium in which the computer program is recorded or a transmission medium for transmitting the computer program.

The above summary of the present invention does not enumerate all the necessary features of the present invention. It should be noted that a combination or a sub-combination of the components also may be the present invention.

Of course, one skilled in the art can easily think of making various changes, such as combining hardware components of the computer used in one embodiment of the present invention with multiple machines and distributing functions thereto to perform the functions. Such changes are concepts which are naturally included in the idea of the present invention. The components, however, are mere examples, and all the components are not necessarily indispensable components of the present invention.

The present invention can be realized as hardware, software or combination of hardware and software. Execution of the computer program described above in a computer in which the computer program is installed can be given as a typical example of execution by combination of hardware and software. In such a case, by the computer program being loaded onto the memory of the computer and executed, the computer program controls the computer and causes the computer to execute a process according to the present invention. The computer program may be constituted by a group of instructions which may be expressed in any language, code or notation. Such a group of instructions enables the computer to execute a particular function directly or after any one or both of 1. conversion to another language, code or notation and 2. duplication to another medium are performed.

According to one embodiment of the present invention, a term (e.g., a term in a term dictionary) may be divided with granularity according to an element word extracted from content (e.g., a manual or a standard operating procedure). As content or the technical field of content differs, an element word extracted from the content may also differ. Therefore, since the granularity dynamically changes according to content or the technical field of content, in accordance with one embodiment of the present invention, a term may be divided with granularity suitable for the content or the technical field of content.

Furthermore, according to one embodiment of the present invention, a term is divided with granularity according to an element word extracted from content without depending on a practitioner's point of view.

Furthermore, according to one embodiment of the present invention, a term is divided with granularity according to an element word extracted from content without requiring a list of main terms or modifiers.

DETAILED DESCRIPTION OF THE EMBODIMENTS

An embodiment of the present invention will be described below in accordance with drawings. The same reference numerals refer to the same objects through the drawings below unless otherwise specified. It should be understood that the embodiments of the present invention is intended to describe preferred aspects of the present invention and is not intended to limit the scope of the present invention to what is shown here.

Figure 1:
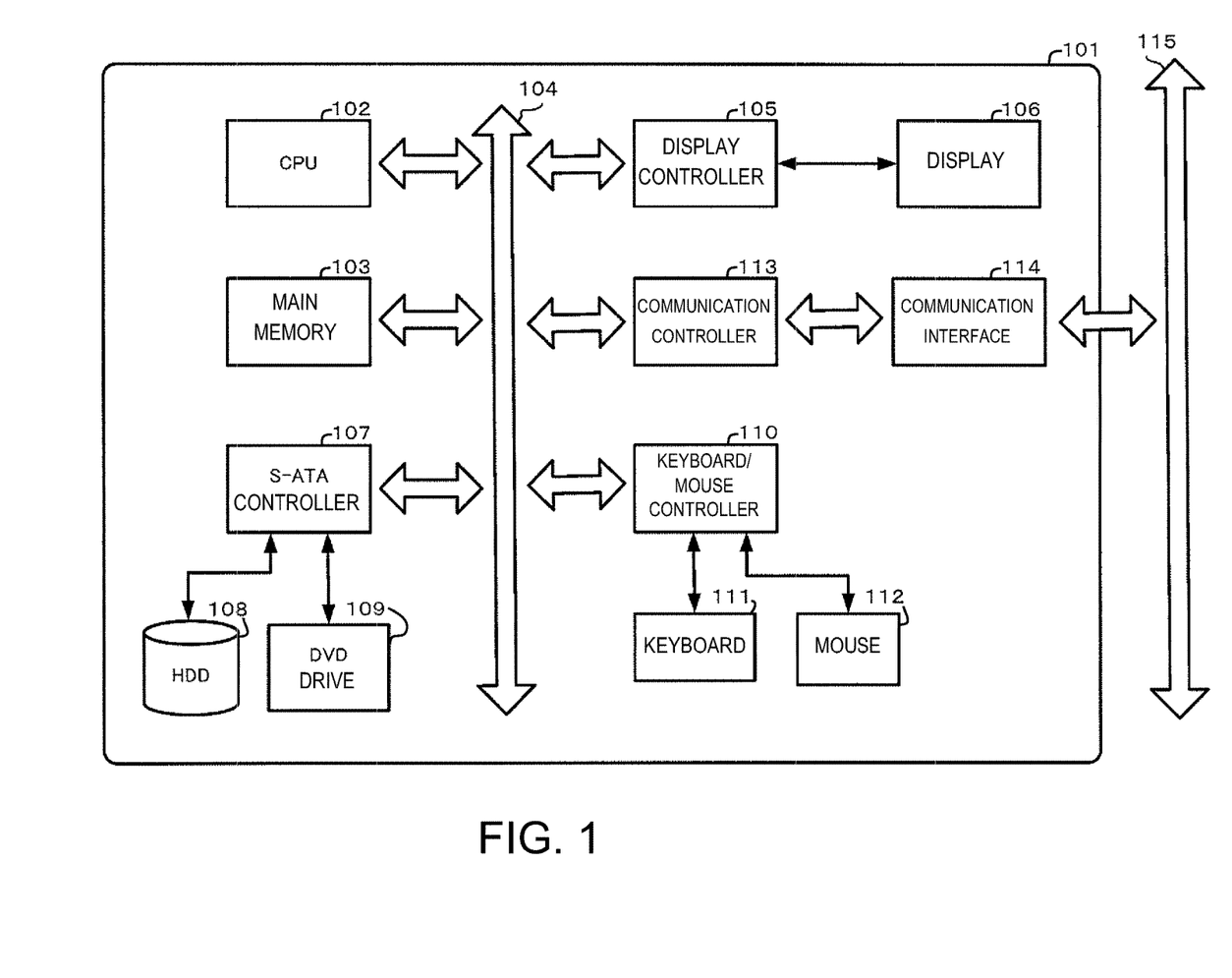
FIG. 1 is a diagram showing an example of a computer system which may be used in one embodiment of the present invention.

FIG. 1 is a diagram showing an example of a computer system which may be used in one embodiment of the present invention.

The computer system, in accordance with one embodiment of the present invention, may be configured with one or more computer systems.

For example, FIG. 1 is a diagram showing an example of a hardware configuration for realizing the computer system which may be used in one embodiment of the present invention.

The computer system (101) may be, for example, a computer (e.g., a desktop computer, a notebook computer, an ultrabook computer or a server computer).

The computer system (101) is provided with a CPU (102) and a main memory (103), and these are connected to a bus (104). The CPU (102) is preferably based on a 32-bit or 64-bit architecture. The CPU (102) may be, for example, Core™ i series, Core™ 2 series, Atom™ series, Xeon® series, Pentium® series or Celeron® series by Intel Corporation, A series, Phenom™ series, Athlon™ series, Turion™ series or Sempron™ by Advanced Micro Devices, Inc. (AMD), or Power™ series by International Business Machines Corporation.

A display (106), for example, a liquid crystal display (LCD), may be connected to the bus (104) via a display controller (105). The liquid crystal display (LCD) may be, for example, a touch panel display or a floating touch display. The display (106) may be used to display information (e.g., a term in a term list, content, an element word or a divided term) displayed by software operating on the computer system (101), for example, a computer program in accordance with one embodiment of the present invention operating, with an appropriate graphic interface.

A storage device (108), for example, a hard disk or a solid state drive may be arbitrarily connected to the bus (104), for example, via an SATA or IDE controller (107).

The storage device (108) and a drive (109), for example, a CD, DVD or BD drive may be arbitrarily connected to the bus (104), for example, via the SATA or IDE controller (107).

A keyboard (111) and a mouse (112) may be arbitrarily connected to the bus (104) via a peripheral device controller (110), for example, via a keyboard/mouse controller or a USB bus.

In the storage device (108), an operating system, for example, Windows® OS, UNIX®, Linux® (e.g., RedHat® or Debian®) or MacOS®, Java® processing environment such as J2EE, Java® applications, Java® Virtual Machine (VM), a program providing a Java® Just-In-Time (JIT) compiler, the computer program in accordance with one embodiment of the present invention, other programs, and data (e.g., a term list and content) are stored such that they can be loaded onto the main memory (103).

The storage device (108) may be included in the computer system (101), may be connected via a cable (e.g., a USB cable or a LAN cable) to allow access by the computer system (101). Otherwise, the storage device (108) may be connected via a wired or wireless network to allow access by the computer system (101).

The drive (109) may be used to install a program, for example, an operating system or an application into the storage device (108), for example, from a CD-ROM, a DVD-ROM or a BD-ROM as necessary.

A communication interface (114) is, for example, in accordance with the Ethernet® protocol. The communication interface (114) is connected to the bus (104) via a communication controller (113) and is responsible for wiredly or wirelessly connecting the computer (101) to a communication line (115). The communication interface (114) provides a network interface layer for the TCP/IP communication protocol, which is the communication function of the operating system of the computer (101). The communication line may be, for example, in a wired LAN environment based on wired LAN connection standards or a wireless LAN environment based on wireless LAN connection standards, for example, a Wi-Fi wireless LAN environment such as IEEE802.11a/b/g/n or a mobile phone network environment (e.g., a 3G or 4G (including LTE) environment).

The computer system (101) can receive data from, for example, another apparatus (e.g., a computer or a network attached storage) via the communication line (115) and store the data on the storage device (108).

Figure 2A:
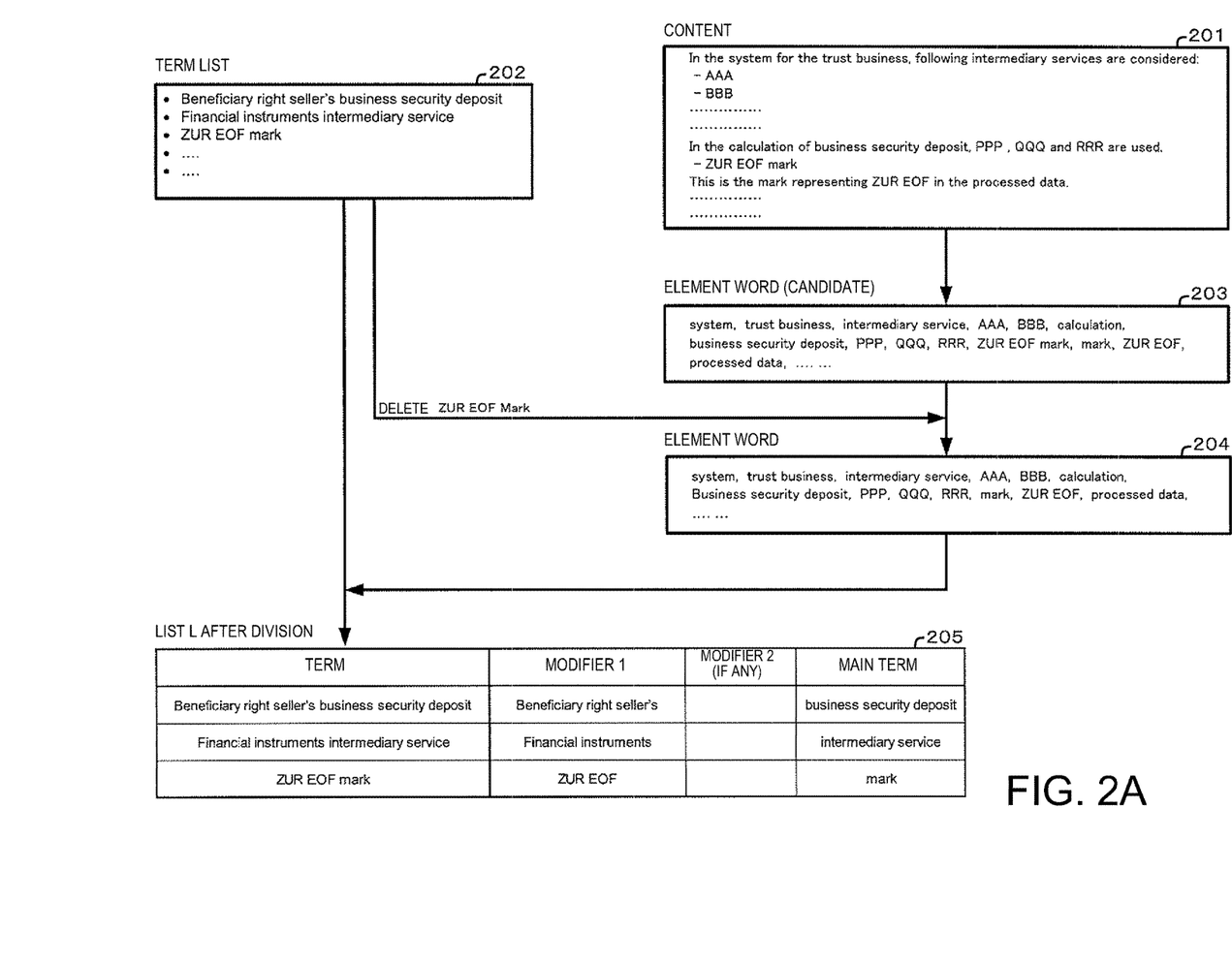
FIG. 2A shows an example of dividing a term (written in English) in a term list at a position where an element word specifying granularity, which has been extracted from content, exists, in accordance with one embodiment of the present invention.
Figure 2B:
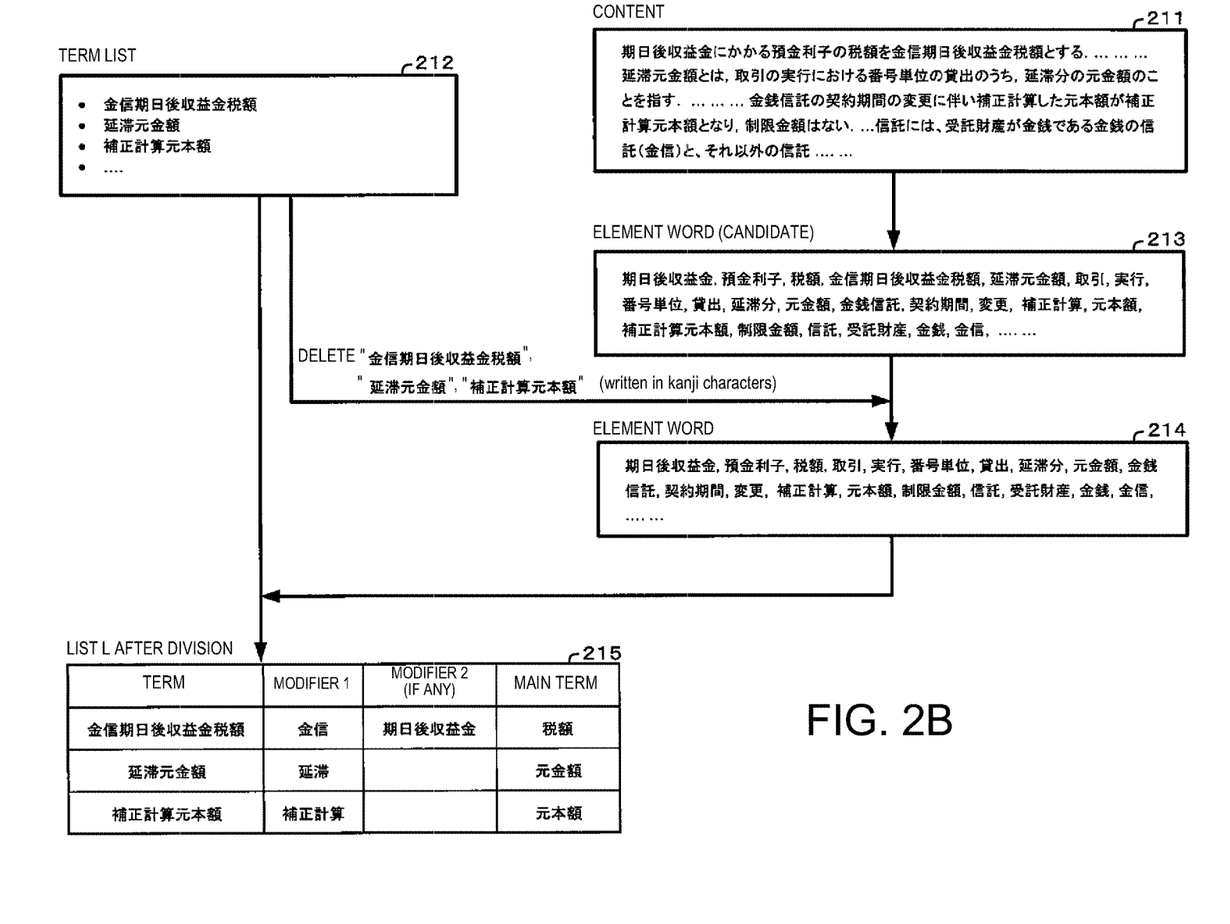
FIG. 2B shows an example of dividing a term (including kanji characters) in a term list at a position where an element word specifying granularity, which has been extracted from content, exists, in accordance with one embodiment of the present invention.

Each of FIGS. 2A and 2B shows an example of extracting an element word specifying granularity from content and dividing a term in a term list at a position where the extracted element word exists, in accordance with one embodiment of the present invention.

FIG. 2A shows an example of a case where the content and the term list are in English.

A user may prepare content (201) for extracting an element word specifying granularity for dividing a term and a term list (202) which includes terms to be divided. The content of each of the content (201) and the term list (202) is as shown in FIG. 2A. It is assumed that the content (201) is a computer-field standard operating procedure, and the term list (202) is also a computer-field term list.

Referring to FIG. 2A, with continued reference to FIG. 1, the computer system (101) is configured to extract an element word specifying granularity from content and divide a term in a term list at a position where the extracted element word exists.

(Method for Extracting Element Word Specifying Granularity from Content)

The computer system (101) is configured to receive the content (201) and the term list (202) as an input and store them, for example, into the main memory (103) or the storage device (108).

The computer system (101) is further configured to cut out text, from the content (201), from which an element word is to be extracted. For example, the computer system is configured to (101) cut out the text, from the content (201), for example, of a body by deleting, for example, a change history, and comments or notes.

The computer system (101) is further configured to divide the cut-out text at a place where a predefined character exists (e.g., before and after the place where the predefined character exists). The predefined character may be, for example, a broad-sense punctuation mark. Broad-sense punctuation marks can include a narrow-sense punctuation mark (e.g., a period or a comma), a question mark, an exclamation mark, an apostrophe, parentheses (e.g., round brackets, corner brackets, square brackets, curly brackets, tortoise-shell brackets, angle brackets or lenticular brackets), or other various marks used in a sentence. For example, the computer system (101) is configured to divide the text before and after the mark "-" of "-AAA", "-BBB" and "-ZUR" in the content (201).

By applying any dependency parsing technique known to one skilled in the art to each of the divided pieces of text with the predefined character, the computer system (101) is configured to extract phrases.

The computer system (101) is configured to extract parts which may be element words (e.g., element word candidates) (203) from phrases which include a noun or a mark, among the extracted phrases. The noun may be a character classified as a so-called grammatical noun. The mark can include an unknown word, which does not exist in a dictionary, or a clipped word in natural language processing. The element word may be a string of one or multiple words which includes at least one noun or mark. The element word candidates (203) are as shown in FIG. 2A. Among the element word candidates (203), all of "AAA", "BBB", "PPP", "QQQ" and "RRR" are phrases which include a noun or a mark. Among the element word candidates (203), "ZUR" is a proper noun, and "EOF" is an abbreviation of "End-Of-File".

The computer system (101) is further configured to determine whether the element word candidates (203) include a term existing in the term list (202). The term may be a word string which includes a noun, a mark or combination thereof. The term may be, for example, a compound noun. For example, since the element word candidates (203) include a term "ZUR EOF mark" existing in the term list (202), the computer system (101) is configured to delete the element word, "ZUR EOF mark" from the element word candidates (203) and causes the remainder, after deleting the element word "ZUR EOF mark", to be element words specifying granularity (204).

(Method for Dividing Term in Term List at Position Where Extracted Element Word Exists)

The computer system (101) is configured to take out one term from the term list (202) and determine whether the taken-out term includes a longest-match element word from the end thereof (204). If the taken-out term includes the longest-match element word from the end thereof (204), the computer system (101) is configured to divide the term at a position where the longest-match element word from the end thereof exists. Then, the computer system (101) is configured to store the term obtained by separating the longest-match element word from the end, into a list L (205) for placing terms after division.

For example, the computer system (101) may take out "Beneficiary right seller's business security deposit" in the term list (202) and determine whether "Beneficiary right seller's business security deposit" includes a longest-match element word from the end thereof (204). Since "Beneficiary right seller's business security deposit" includes "business security deposit", the longest-match element word from the end thereof, the computer system (101) may divide "Beneficiary right seller's business security deposit" at a position where "business security deposit", the longest-match element word from the end thereof, exists (e.g., immediately before "business security deposit"), that is, divide "Beneficiary right seller's business security deposit" into "Beneficiary right seller's" and "business security deposit". Then, the computer system (101) may store "business security deposit", the term obtained by separating the longest-match element word from the end, into the list L (205). Thus, "Beneficiary right seller's business security deposit" is divided according to the granularity of "business security deposit", an element word in the content (201).

Similarly, for example, the computer system (101) may take out "Financial instruments intermediary service" in the term list (202) and determine whether "Financial instruments intermediary service" includes a longest-match element word from the end thereof (204). Since "Financial instruments intermediary service" includes "intermediary service", the longest-match element word from the end thereof, the computer system (101) may divide "Financial instruments intermediary service" at a position where "intermediary service", the longest-match element word from the end thereof, exists (e.g., immediately before "intermediary service"), that is, divide "Financial instruments intermediary service" into "Financial instruments" and "intermediary service". Then, the computer system (101) may store "intermediary service", the term obtained by separating the longest-match element word from the end, into the list L (205). Thus, "Financial instruments intermediary service" is divided according to the granularity of "intermediary service", an element word in the content (201).

Similarly, for example, the computer system (101) may take out "ZUR EOF mark" in the term list (202) and determine whether "ZUR EOF mark" includes a longest-match element word from the end thereof (204). Since "ZUR EOF mark" includes "mark", the longest-match element word from the end thereof, the computer system (101) may divide "ZUR EOF mark" at a position where "mark", the longest-match element word from the end thereof, exists (e.g., immediately before "mark"), that is, divide "ZUR EOF mark" into "ZUR EOF" and "mark". Then, the computer system (101) may store "mark", the term obtained by separating the longest-match element word from the end, into the list L (205). Thus, "ZUR EOF mark" is divided according to the granularity of "mark", an element word in the content (201).

Next, the computer system (101) is further configured to determine whether a term remaining after removing the term obtained by separating the longest-match element word from the end, from the taken-out term includes a longest-match element word from the top of the term remaining after the removal (204). If the term remaining after removing the term obtained by separating the longest-match element word from the end from the taken-out term includes the longest-match element word from the top of the term remaining after the removal, the computer system (101) is configured to divide the term remaining after the removal at a position where the longest-match element word from the top thereof exists. Then, the computer system (101) is configured to store the term obtained by separating the longest-match element word from the top, into the list L (205).

For example, the computer system (101) may determine whether "Beneficiary right seller's", a term obtained by removing "business security deposit" in "Beneficiary right seller's business security deposit" in the term list (202) includes a longest-match element word from the top thereof (204). Since "business security deposit" does not include the longest-match element word from the top (204), the computer system (101) may store "business security deposit" into the list L (205) and end the division process.

Similarly, for example, the computer system (101) may determine whether "Financial instruments", a term obtained by removing "intermediary service" in "Financial instruments intermediary service" in the term list (202) includes a longest-match element word from the top thereof (204). Since "Financial instruments" does not include the longest-match element word from the top thereof (204), the computer system (101) may store "Financial instruments" into the list L (205) and end the division process.

Similarly, for example, the computer system (101) may determine whether "ZUR EOF", a term obtained by removing "mark" in "ZUR EOF mark" in the term list (202) includes a longest-match element word from the top thereof (204). The term "ZUR EOF" obtained by the removal includes "ZUR EOF", the longest-match element word from the top. However, since the former and the latter are the same, it is not possible to perform division. Therefore, the computer system (101) may store "ZUR EOF" into the list L (205) and end the division process.

Therefore, for example, the list L (205), after the above division process, includes "Beneficiary right seller's", "business security deposit", "Financial instruments", "intermediary service", "ZUR EOF" and "mark".

The computer system (101) is configured to display the list L (205) after the above division process on the display (106) with the first longest-match element word from the end as a main term, the first longest-match element word from the top as a modifier 1, and the second longest-match element word from the end as a modifier 2, if any, as shown in FIG. 2A.

Alternatively, the computer system (101) is configured to display the list L (205) after the division process on the display (106) with a mark indicating a position of division, for example, "|" inserted therein as shown below. For example, the list L (205) is displayed as below.

Beneficiary right seller's|business security deposit Financial instruments|intermediary service ZUR EOF|mark According to a morphological analyzer in accordance with a conventional technique, each of the terms in the term list (202), for example, "Beneficiary right seller's business security deposit", "Financial instruments intermediary service" and "ZUR EOF mark", may be divided word by word because the words are generally written being separated by spaces. On the other hand, according to one embodiment of the present invention, a term may be divided according to the granularity of an element word (204) extracted from content (201) as shown in the list L (205) after the above division method.

FIG. 2B shows an example of a case where the content and the term list are in Japanese (including kanji characters).

The user may prepare content (211) for extracting an element word specifying granularity for dividing a term and a term list (212) which includes terms to be divided. The content of each of the content (211) and the term list (212) is as shown in FIG. 2B. It is assumed that the content (211) is a financial-field standard operating procedure, and the term list (212) is also a financial-field term list.

Referring to FIG. 2B, with continued reference to FIG. 1, the computer system (101) is configured to extract an element word specifying granularity from content and divide a term in a term list at a position where the extracted element word exists.

(Method for Extracting Element Word Specifying Granularity from Content)

The computer system (101) is configured to receive the content (211) and the term list (212) as an input and store them, for example, into the main memory (103) or the storage device (108).

The computer system (101) is further configured to cut out text, from the content (211), from which an element word is to be extracted. To cut out the text is as described above.

The computer system (101) is further configured to divide the cut-out text at a place where a predefined character exists (e.g., before and after the place where the predefined character exists). The predefined character is as described above. For example, the computer system (101) is configured to divide text before and after each of the parentheses "("and")" of " " (written in kanji characters) in the content (211).

By applying any dependency parsing technique known to one skilled in the art to each of the divided pieces of text with the predefined character, the computer system (101) is configured to extract phrases.

The computer system (101) is configured to extract parts which may be element words (e.g., element word candidates) (213) from phrases which include a noun or a mark, among the extracted phrases. The element word candidates (213) are as shown in FIG. 2B.

The computer system (101) is further configured to determine whether the element word candidates (213) include a term existing in the term list (212). For example, since the element word candidates (213) include " " (written in kanji characters), " " (written in kanji characters) and " " (written in kanji characters), terms existing in the term list (212), the computer system (101) is configured to delete the element words, " " (written in kanji characters), " " (written in kanji characters) and " " (written in kanji characters) from the element word candidates (213) and cause the remainder, after deleting these element words, to be element words specifying granularity (214).

(Method for Dividing Term in Term List at Position Where Extracted Element Word Exists)

The computer system (101) is configured to take out one term from the term list (212) and determine whether the taken-out term includes a longest-match element word from the end thereof (214). If the taken-out term includes the longest-match element word from the end thereof (214), the computer system (101) is configured to divide the term at a position where the longest-match element word from the end thereof exists. Then, the computer system (101) is configured to store the term obtained by separating the longest-match element word from the end, into a list L (215) for placing terms after division.

For example, the computer system (101) may take out " " (written in kanji characters) in the term list (212) and determine whether " " (written in kanji characters) includes a longest-match element word from the end thereof (214). Since " " (written in kanji characters) includes " " (written in kanji characters), the longest-match element word from the end thereof, the computer system (101) may divide " " (written in kanji characters) at a position where " " (written in kanji characters), the longest-match element word from the end thereof, exists (e.g., immediately before " " (written in kanji characters)), that is, into (written in kanji characters) and " " (written in kanji characters). Then, the computer system (101) may store " " (written in kanji characters), the term obtained by separating the longest-match element word from the end, into the list L (215). Thus, " " (written in kanji characters) is divided according to the granularity of " " (written in kanji characters), an element word in the content (211).

Similarly, for example, the computer system (101) may take out " " (written in kanji characters) in the term list (212) and determine whether " " (written in kanji characters) includes a longest-match element word from the end thereof (214). Since " " (written in kanji characters) includes " " (written in kanji characters), the longest-match element word from the end thereof, the computer system (101) may divide " " (written in kanji characters) at a position where " " (written in kanji characters), the longest-match element word from the end thereof, exists (that is, immediately before " " (written in kanji characters)), that is, into " " (written in kanji characters) and " " (written in kanji characters). Then, the computer system (101) may store " " (written in kanji characters), the term obtained by separating the longest-match element word from the end, into the list L (215). Thus, " " (written in kanji characters) is divided according to the granularity of " " (written in kanji characters), an element word in the content (211).

Similarly, for example, the computer system (101) may take out " " (written in kanji characters) in the term list (212) and determine whether " " (written in kanji characters) includes a longest-match element word from the end thereof (214). Since " " (written in kanji characters) includes " " (written in kanji characters), the longest-match element word from the end thereof, the computer system (101) may divide " " (written in kanji characters) at a position where " " (written in kanji characters), the longest-match element word from the end thereof, exists (e.g., immediately before " " (written in kanji characters)), that is, into " " (written in kanji characters) and " " (written in kanji characters). Then, the computer system (101) may store " " (written in kanji characters), the term obtained by separating the longest-match element word from the end, into the list L (215). Thus, " " (written in kanji characters) is divided according to the granularity of " " (written in kanji characters), an element word in the content (211).

Next, the computer system (101) is further configured to determine whether a term remaining after removing the term obtained by separating the longest-match element word from the end, from the taken-out term includes a longest-match element word from the top of the term remaining after the removal (214). If the term remaining after removing the term obtained by separating the longest-match element word from the end from the taken-out term includes the longest-match element word from the top of the term remaining after the removal, the computer system (101) is configured to divide the term remaining after the removal at a position where the longest-match element word from the top thereof exists. Then, the computer system (101) is configured to store the term obtained by separating the longest-match element word from the top, into the list L (215).

For example, the computer system (101) may determine whether " " (written in kanji characters), a term obtained by removing " " (written in kanji characters) in " " (written in kanji characters) in the term list (212) includes a longest-match element word from the top thereof (214). Since " " (written in kanji characters) includes " " (written in kanji characters), the longest-match element word from the top thereof, the computer system (101) may divide " " (written in kanji characters) at a position where " " (written in kanji characters), the longest-match element word from the top thereof, exists (e.g., immediately after " " (written in kanji characters)), that is, into " " (written in kanji characters) and " " (written in kanji characters). Then, the computer system (101) may store " " (written in kanji characters), the term obtained by separating the longest-match element word from the top, into the list L (215). Thus, " " (written in kanji characters) is divided according to the granularity of " " (written in kanji characters), an element word in the content (211).

Similarly, for example, the computer system (101) may determine whether " " (written in kanji characters), a term obtained by removing " " (written in kanji characters) in " " (written in kanji characters) in the term list (212) includes a longest-match element word from the top thereof (214). Since " " (written in kanji characters) does not include the longest-match element word from the top thereof (214), the computer system (101) may store " " (written in kanji characters) into the list L (215) and end the division process.

Similarly, for example, the computer system (101) may determine whether " " (written in kanji characters), a term obtained by removing " " (written in kanji characters) in " " (written in kanji characters) in the term list (212) includes a longest-match element word from the top thereof (214). Though " " (written in kanji characters) includes " " (written in kanji characters), the longest-match element word from the top thereof, the computer system (101) cannot perform division because the former and the latter are the same. Therefore, the computer system (101) may store " " (written in kanji characters) into the list L (215) and end the division process.

Next, the computer system (101) may determine whether " " (written in kanji characters), the remaining word in " " (written in kanji characters), includes a longest-match element word from the end thereof (214). The remaining word " " (written in kanji characters) includes " " (written in kanji characters), the longest-match element word from the top. However, since the former and the latter are the same, it is not possible to perform division. Therefore, the computer system (101) may store " " (written in kanji characters) into the list L (215) and end the division process.

Therefore, for example, the list L (215) after the above division process includes " " (written in kanji characters), " " " " (written in kanji characters), " " (written in kanji characters), " " (written in kanji characters), " " (written in kanji characters), " " (written in kanji characters) and " " (written in kanji characters).

The computer system (101) is configured to display the list L (215) after the above division process on the display (106) with the first longest-match element word from the end as a main term, the first longest-match element word from the top as a modifier 1, and the second longest-match element word from the end as a modifier 2, if any, as shown in FIG. 2B.

Alternatively, the computer system (101) is configured to display the list L (215) after the division process on the display (106) with a mark indicating a position of division, for example, "|" inserted therein as shown below. For example, the list L (215) is displayed as below.

" " (written in kanji characters)

According to a morphological analyzer in accordance with a conventional technique, each of the compound nouns of the terms in the term list (212), for example, " " (written in kanji characters), " " (written in kanji characters) and " " (written in kanji characters) may be divided on the basis of a system dictionary and grammar held by the morphological analyzer in accordance with the conventional technique, for example, as " " (written in kanji characters), " " (written in kanji characters) and " " (written in kanji characters). Therefore, the compound noun is not necessarily divided at a desirable position. On the other hand, according to one embodiment of the present invention, a term may be divided according to the granularity of an element word (214) extracted from content (211) as shown in the list L (215) after the above division process.

Terms obtained by dividing a term according to the granularity of an element word extracted from content in accordance with one embodiment of the invention, as shown in each of FIGS. 2A and 2B, may be used in applications shown in each of (1) to (3) below.

(1) Divided words may be sorted according to main terms or, for example, modifiers 1 or modifiers 2. By sorting the words, it becomes easy for the user, for example, to find similar or synonymous words to be unified, check a word to be added or find a word constituted only by a short main term.

(2) When the degree of abstraction of a main term is high, it becomes easy for the user to replace the main term with multiple concrete terms. The main term with a high degree of abstraction is, for example, " " (written in kanji characters).

(3) It becomes easy for the user to find a term with a very long main term. This makes it easy for the user to judge that the term is not described in specifications or makes it possible to add description for explaining the term to the specifications in order to have common understanding among those concerned. For example, it is assumed that, as a result of the above division, a relevant element word does not exist in element words (214) extracted from content (211), and " " (written in kanji characters) and " " (written in kanji characters) are obtained as main terms. In such a case, the computer system (101) may perform extraction as terms having the long main terms, " " (written in kanji characters) and " " (written in kanji characters).

Figure 3A:
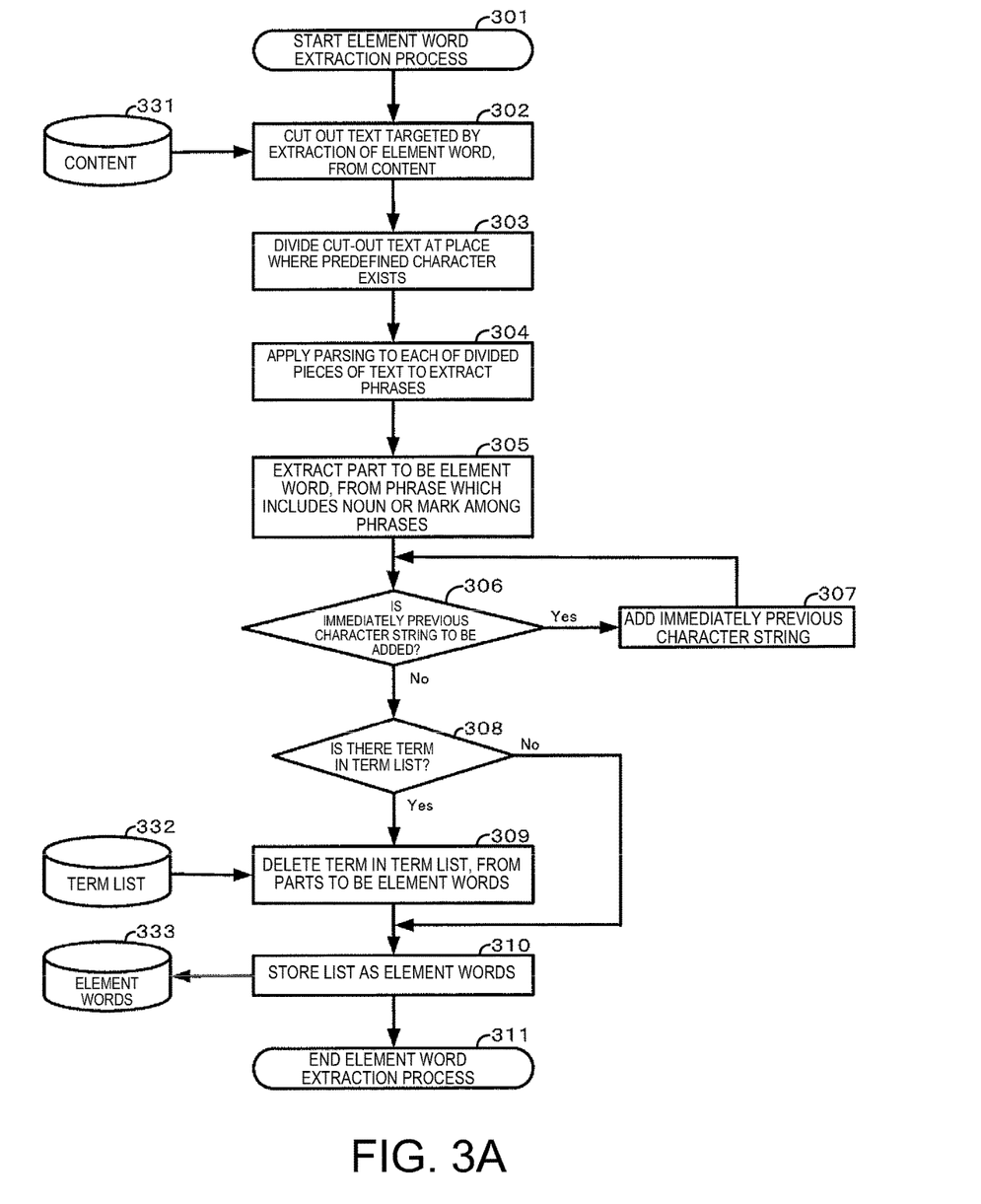
FIG. 3A shows a flowchart for a method for extracting an element word specifying granularity from content in accordance with one embodiment of the present invention.
Figure 3B:
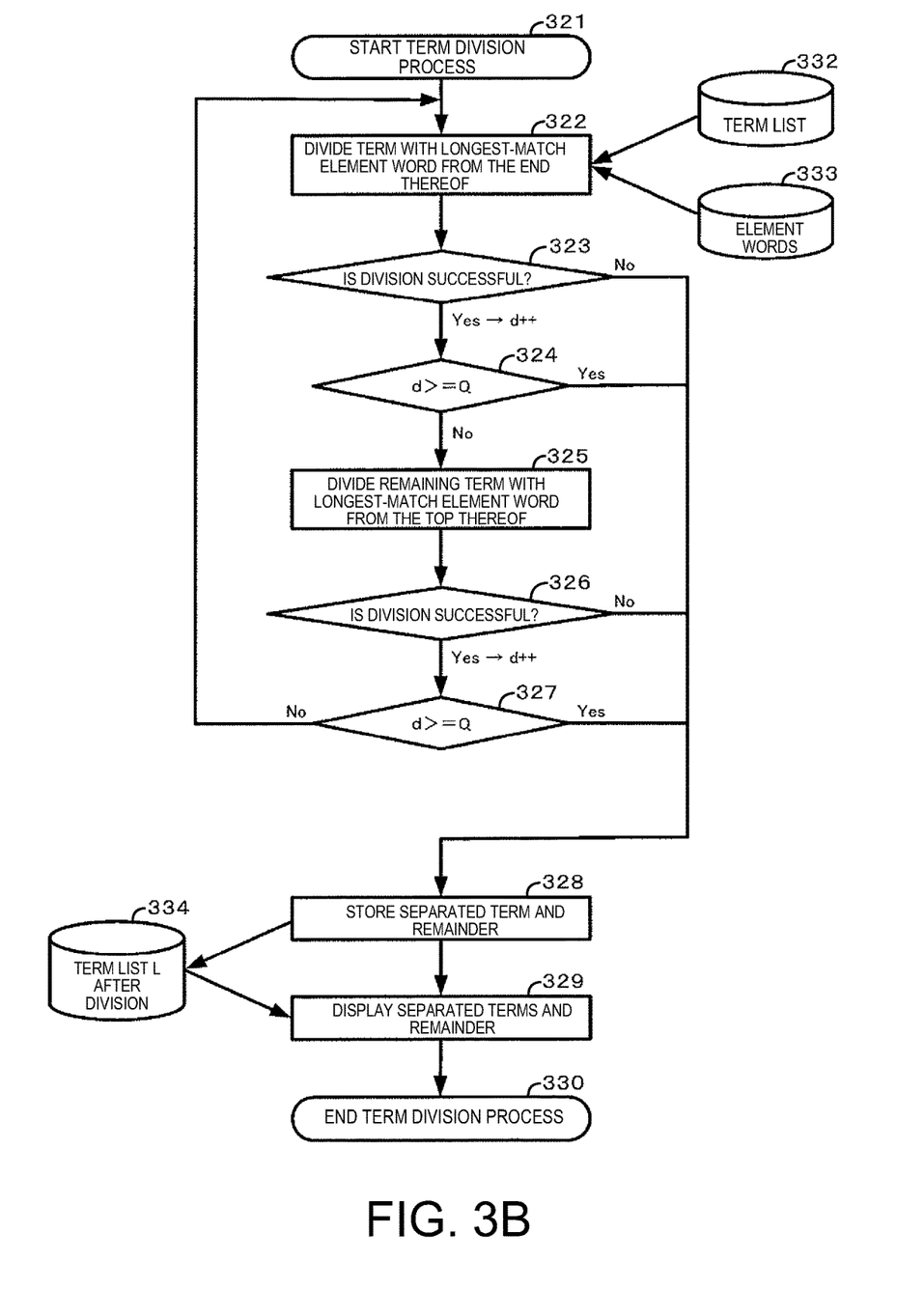
FIG. 3B shows a flowchart for a method for dividing a term at a position where an element word exists, in accordance with one embodiment of the present invention.

FIGS. 3A and 3B show flowcharts for a method for extracting an element word specifying granularity from content and dividing a term in a term list at a position where the extracted element word exists, in accordance with one embodiment of the present invention.

FIG. 3A shows a flowchart for a method for extracting an element word specifying granularity from content in accordance with one embodiment of the present invention.

At step 301, the computer system (101) starts the process for extracting the above element word from content.

At step 302, the computer system (101) reads out content for extracting an element word specifying granularity therefrom, from a recording medium (331) in which the content is recorded. The content may be, for example, a document for which it is necessary to create an index, for example, a business document (e.g., specifications, a standard operating procedure or a business tool definition document), but is not limited thereto. If the content is, for example, specifications, data items and business processes are described together with explanation. As the technical field or application field to which content belongs differs, an element word extracted therefrom may also differ. That is, the granularity for dividing a term differs according to content.

Then, at step 302, the computer system (101) can arbitrarily cut out text from which the element word is to be extracted, from the read-out content. For example, the computer system (101) can cut out the text of a body by deleting a change history, and comments or notes from content (331).

At step 303, the computer system (101) divides the text cut out at step 302 at a place where a predefined character exists (e.g., before and after the place where the predefined character exists). The predefined character may be, for example, a broad-sense punctuation mark. Broad-sense punctuation marks can include a narrow-sense punctuation mark (e.g., a period or a comma), a question mark, an exclamation mark, an apostrophe, parentheses (e.g., round brackets, corner brackets, square brackets, curly brackets, tortoise-shell brackets, angle brackets or lenticular brackets), and other various marks used in a sentence. For example, if the text is "Confirm the item number (check whether the order is valid) in this process" (written in English), the computer system (101) divides the text before and after the round brackets as "Confirm the item number| (|check whether the order is valid|)|in this process" ("|" indicates a position of division). Similarly, if the text is "Confirm the item number (to know whether it is the same as the order)", the computer system (101) divides the text before and after the brackets as "Confirm the item number| (|to know whether it is the same as the order|)|" ("|" indicates the position of division).

At step 304, the computer system (101) applies any dependency parsing technique known to one skilled in the art to each of the pieces of text divided at step 303 to extract phrases. For example, if the text is "In the calculation/of business security deposit/, PPP/, QQQ/and RRR/are used" (written in English), the computer system (101) extract phrases as "In the calculation/of business security deposit/, PPP/, QQQ/and RRR/are used" (wherein "/" indicates a separator for extracting a phrase). Similarly, for example, if the text is "Midterm cancellation payment received is determined on the basis of a deposit period", the computer system (101) extracts phrases as "Midterm cancellation payment received/is determined/on the basis of a deposit period" (wherein "/" indicates a separator for extracting a phrase).

At step 305, the computer system (101) extracts a part which may be an element word, from a phrase which includes a noun or a mark among the phrases extracted at step 304. The computer system (101) can list up such extracted parts as element word candidates. The noun may be a character classified as a so-called grammatical noun. The mark can include an unknown word, which does not exist in a dictionary, or a clipped word in natural language processing. The element word may be a string of one or multiple words which includes at least one noun or mark. For example, to extract a part which may be an element word includes excluding articles, in the case of English. Furthermore, to extract a part which may be an element word can include performing, for the extracted part, a transformation process similar to converting a plural form to a singular form, converting capital letters to small letters and transforming an old form of a character to a new form of the character.

At step 306, the computer system (101) arbitrarily determines whether or not to complement the part extracted at step 305 with a character string immediately before the part. For example, if the character string is a technical term, the one term may be divided into multiple parts by using any dependency parsing technique. Therefore, by complementing the part extracted at step 305 with the character string immediately before the part, the computer system (101) can complement one term divided into multiple parts, with the immediately previous character string so that the term becomes the original one term. For example, if the extracted part is "File:Open/Menu" (written in English) ("/" indicates a separator), "File:Open" is detected as an unknown word because it has not a space and ":" is inserted therein, and "Menu" is separately detected as a noun. Therefore, as for the extracted part "File:Open/Menu", "File:Open" is added immediately before "Menu" to obtain the original one unified term "File:Open Menu". For example, if the above extracted part is "sai/ban" (written in kanji characters) ("/" indicates a separator), "sai" is added immediately before "ban" to obtain an original one term "saiban" (written in kanji character; "saiban" means to give a unique number to each of pieces of data for data management). When complementation with the immediately previous character string is to be performed, the computer system (101) advances the process to step 307. On the other hand, if complementation with the immediately previous character string is not to be performed, the computer system (101) advances the process to step 308.

At step 307, the computer system (101) complements the part extracted at step 305 with the character string immediately before the part. Then, the computer system (101) can update the list of element word candidates with the complemented character string. Then, the computer system (101) returns to step 306 and can judge whether it is necessary to perform further complementation.

At step 308, the computer system (101) reads terms, for example, into the main memory (103). Each term may be a word string which includes nouns, marks (including an unknown word and a clipped word) or combination thereof. Reading of the terms is performed, for example, by reading a term list in which the terms are stored from a recording medium (332) in which the term list is recorded. Alternatively, the computer system (101) can read terms specified by the user as an input. Further alternatively, the computer system (101) can read terms longer than a predetermined length (for example, longer than an average string length of element words or longer than, for example, ten characters) in the content (331) as terms to be divided. Then, the computer system (101) determines whether the same term as any of the parts which may be element words, which have been extracted at step 305, exists in the term list. This is because, even if the same term as any of the parts which may be element words exists in the term list, the parts which may be element words cannot be element words for dividing a term in the term list. If the same term as any of the parts which may be element words exists in the term list, the computer system (101) advances the process to step 309. On the other hand, if the same term as any of the parts which may be element words does not exist in the term list, the computer system (101) advances the process to step 310.

At step 309, if the same term as any of the parts which may be element words exists in the term list, the computer system (101) deletes the same term from the list of element word candidates. In the term list, for example, data items or business processes are written. The list may be expressed, for example, as Kwds={k_1, k_2, k_3, . . . , k_n}.

At step 310, the computer system (101) stores the list of element word candidates, for example, into a recording medium (333) as element words specifying granularity from content.

At step 311, the computer system (101) ends the process for extracting an element word from content.

FIG. 3B shows a flowchart for a process for dividing a term at a position where an element word exists, in accordance with one embodiment of the present invention.

At step 321, the computer system (101) starts a process for dividing a term at a position where an element word created at step 310 exists.

At step 322, the computer system (101) takes out one term, for example, from a term list (332). Then, the computer system (101) determines whether the one term taken out includes a longest-match element word from the end thereof (which is stored in the storage medium (333)). If the taken-out term includes the longest-match element word from the end thereof (204), the computer system (101) divides the term at a position where the longest-match element word from the end thereof exists. Then, the computer system (101) stores the term obtained by separating the longest-match element word from the end, into a list L (334) for placing terms after division. The computer system (101) can store the term obtained by separating the longest-match element word from the end into the list L (334) as a main term.

At step 323, if the above division at step 322 is successful, the computer system (101) increases the number of times of divisions d of term by one (d++) and advances the process to step 324. On the other hand, if the above division at step 322 is not successful, the computer system (101) advances the process to step 328.

At step 324, the computer system (101) compares the number of divisions d with a division parameter Q specifying the number of divisions of term. If the number of divisions d is smaller than the division parameter Q, the computer system (101) advances the process to step 325 in order to further perform the division process. On the other hand, if the number of divisions d is equal to or larger than the division parameter Q, the computer system (101) advances the process to step 328 in order not to perform the division process any more.

At step 325, the computer system (101) determines whether a term remaining after removing the term obtained by separating the longest-match element word from the end, from the term taken out at step 322 includes a longest-match element word from the top of the term remaining after the removal. If the term remaining after removing the term obtained by separating the longest-match element word from the end from the taken-out term includes the longest-match element word from the top of the term remaining after the removal, the computer system (101) divides the term remaining after the removal at a position where the longest-match element word from the top thereof exists. Then, the computer system (101) stores the term obtained by separating the longest-match element word from the top, into a list L (334) for placing terms after division. The computer system (101) can store the term obtained by separating the longest-match element word from the top into the list L (334) as a modifier 1.

At step 326, if the above division at step 325 is successful, the computer system (101) increases the number of times of divisions d of the term by one (d++) and advances the process to step 327. On the other hand, if the above division at step 325 is not successful, the computer system (101) advances the process to step 328.

At step 327, the computer system (101) compares the number of divisions d with a division parameter Q specifying the number of divisions of term. If the number of divisions d is smaller than the division parameter Q, the computer system (101) returns the process to step 322 in order to further perform the division process. Then, the computer system (101) can repeatedly determine whether a longest-match element word from the end exists and whether a longest-match element word from the top exists. On the other hand, if the number of divisions d is equal to or larger than the division parameter Q, the computer system (101) advances the process to step 328 in order not to perform the division process any more.

At step 328, the computer system (101) stores the separated term and the reminder after removing the separated term, if any, into the term list L (334) for storing terms after division.

At step 329, the computer system (101) can arbitrarily display the content of the term list L (the separated terms and the reminder after removing the separated terms, if any), for example, on the display (106).

At step 330, the computer system (101) ends the process for dividing a term at a position where an element word exists.

Figure 4:
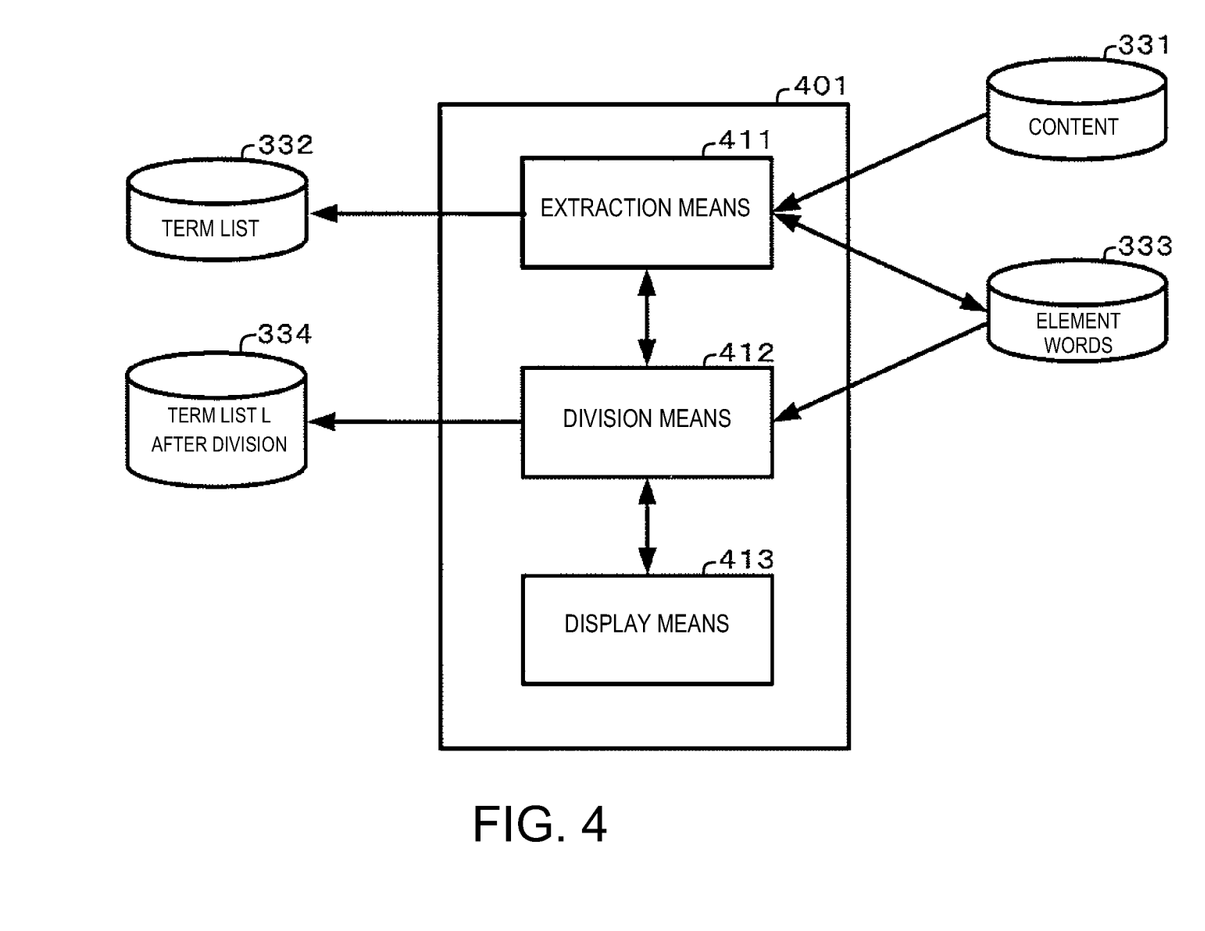
FIG. 4 is a diagram showing an example of a functional block diagram of a computer which is preferably provided with a hardware configuration in accordance with FIG. 1, and which implements one embodiment of the present invention in accordance with the flowchart shown in each of FIGS. 3A and 3B.

FIG. 4 is a diagram showing an example of a functional block diagram of a computer system which is preferably provided with a hardware configuration in accordance with FIG. 1 and which implements one embodiment of the present invention in accordance with the flowchart shown in each of FIGS. 3A and 3B.

A computer system (401) is provided with the components shown in the computer system (101) shown in FIG. 1A, for example, the CPU (102), the main memory (103), the storage device (108) and a disk (108).

The computer system (401) is provided with extraction means (411), division means (412) and display means (413).

The extraction means (411) is configured to extract an element word specifying granularity from content by parsing.

The extraction means (411) is further configured to apply parsing to each of pieces of text in the content to extract phrases, and extract a part which may be the element word, from phrases which include a noun or a mark among the phrases extracted.

Furthermore, the extraction means (411) is further configured to cut out, from the content, pieces of text from which the element word is to be extracted, and apply the parsing to each of the cut-out pieces of text to extract the phrases.

Furthermore, the extraction means (411) is further configured to divide the cut-out pieces of text at a place where a predefined character exists, and apply the parsing to each of the divided pieces of text to extract the phrases.

Furthermore, if the term is a term in a term list, the extraction means (411) is further configured to delete the term in the term list from the part which may be an element word, and set the remainder after the deletion as the element word.

The extraction means (411) is further configured to execute each step shown in FIG. 3A.

If the term includes at least one element word in a part thereof, the division means (412) is configured to divide the term at a position where the element word exists.

Furthermore, if the term includes a longest-match element word from the end of the term (a first element word), the division means (412) is further configured to divide the term at a position where the longest-match element word from the end of the term (the first element word) exists.

Furthermore, the division means (412) is further configured to divide the term at a position where the longest-match element word from the end (the first element word) exists and store the longest-match element word from the end (the first element word) as a main term of the term.

Furthermore, if a term remaining after removing the longest-match element word from the end (the first element word) from the term includes a longest-match element word from the top of the term remaining after the removal (a second element word), the division means (412) is further configured to divide the term remaining after the removal at a position where the longest-match element word from the top (the second element word) exists.

Furthermore, the division means (412) is further configured to divide the term remaining after the removal at the position where the longest-match element word from the top (the second element word) exists and store the longest-match element word from the top (the second element word) as a first modifier of the term.

Furthermore, the division means (412) is further configured to divide the term remaining after the removal at the position where the longest-match element word from the top (the second element word) exists and store a part other than the longest-match element word from the top (the second element word) as a second modifier.

Furthermore, the division means (412) is further configured to divide the term at a position where the element word exists in accordance with a division parameter specifying the number of divisions set in advance.

The division means (412) is further configured to execute steps 322 to 328 shown in FIG. 3B.

The display means (413) is configured to display the content of the term list L, for example, on the display (106).

The display means (413) is further configured to execute step 329 shown in FIG. 3B.

According to one embodiment of the present invention, it is possible to divide a term with granularity according to an element word extracted from content, as described above. Thus, as the technical field or the application field to which content belongs differs, an element word extracted therefrom may also differ, and, therefore, the granularity of the element word for dividing a term also differs. A term divided in this way may be used in applications shown in each of (1) and (2) below.

(1) For example, in a scene of changeover to a new system by large-scale system improvement or system integration, it is necessary to review terms used in the previous system design. For example, it is necessary to delete terms which are not used in the new system, check terms to be newly reviewed in the new system (e.g., terms related to new business processes), review terms which have been ambiguously used, and, where different terms having the same meaning are used between different systems, unify the different terms. In such cases, by dividing a term with an element word extracted from content in accordance with one embodiment of the present invention, the term is divided with an appropriate granularity, and, therefore, the review of terms described above can be performed on the basis of a result of division. In this point, the division in accordance with one embodiment of the present invention is useful.

(2) At the time of performing the review of terms, it is necessary to provide structure rules in the case where the terms are data items because the terms are column names of a database or variables in a program. In such a case, by dividing a term with an element word extracted from content in accordance with one embodiment of the present invention, the term is divided with an appropriate granularity, and, therefore, the structure rules can be provided on the basis of a result of division. By providing the structure rules, it is possible to understand the structure of terms in common, and it is further possible to expect that understanding of a concept meant by a term is uniquely determined. Furthermore, it is not necessary to create an unclear term. In these points, the division described above in accordance with one embodiment of the present invention is useful.

The invention claimed is:

1. A computer-implemented method for dividing a term with appropriate granularity, the method comprising:
   recording, by a recording medium, user-prepared content, wherein the user-prepared content is a document;
   reading the user-prepared content to provide read-out content;
   storing the read-out content in a memory;
   arbitrarily cutting out text from the read-out content to provide cut-out pieces of text;
   dividing the cut-out pieces of text at places where one or more predefined characters exist;
   extracting phrases from each of the cut-out pieces of text;
   extracting one or more element word candidates from each of the extracted phrases, wherein the one or more element word candidates include at least one noun or mark;
   determining that at least one of the one or more element word candidates matches a term in a term list;
   deleting the at least one element word candidate that matches the term in the term list;
   determining that at least one of the one or more element word candidates does not match any terms in the term list;
   storing the at least one element word candidate that does not match the any terms as at least one element word;
   determining that a first term taken out of the term list includes a first element word, wherein the first element word is a longest-match element word from an end of term;
   carrying out a division process on the first term, the division process comprising:
      dividing the first term at a position where the first element word exists;
      storing the first element word in a list for placing terms after division;
      determining that the dividing the first term was successful;
      increasing by one, in response to the determining that the dividing the first term was successful, a number of divisions of the first term;
      comparing the number of divisions of the first term with a division parameter;
      determining, when the number of divisions of the first term is smaller than the division parameter, that a first remainder term includes a second element word, wherein the first remainder term is a term remaining after the first term is divided and the first element word is stored, and wherein the second element word is a longest-match element word from a top of the first remainder term;
      dividing the first remainder term at a position where the second element word exists;
      storing the second element word in the list for placing terms after division;
      determining that the dividing the first remainder term was successful;
      increasing by one, in response to the determining that the dividing the first remainder term was successful, the number of divisions of the first term;
      again comparing the number of divisions of the first term with the division parameter; and storing, when the number of divisions of the first term is equal to or larger than the division parameter, a second remainder term in the list for placing terms after division, wherein the second remainder term is a term remaining after the first remainder term is divided and the second element word is stored;

determining that at least one additional term taken out of the term list includes an additional element word;

carrying out the division process on the at least one additional term;

sorting the list for placing terms after division; and generating a display of the sorted list for placing terms after division on a user interface.

2. The method according to claim 1, further comprising storing the first element word as a main term of the term.

3. The method according to claim 1, further comprising storing the second element word as a first modifier of the term.

4. The method according to claim 1, further comprising storing a part other than the second element word as a second modifier of the term.

5. The method according to claim 1, wherein extracting the phrases comprises:

parsing the divided cut-out pieces of text in the user-prepared content to provide the extracted phrases; and extracting a part from the extracted phrases that include a noun or a mark to provide an element word candidate.

6. The method according to claim 1, wherein the division parameter is a parameter specifying a number of divisions set in advance.

7. The method according to claim 1, wherein the first term is a term longer than a predetermined length in the user-prepared content.

8. The method according to claim 1, wherein the first term is a compound noun.

* * * * *